United States Patent
Ito

(10) Patent No.: US 8,675,244 B2
(45) Date of Patent: Mar. 18, 2014

(54) RENDERING APPARATUS HAVING A DISPLAY LIST CLIP PROCESSING CONTROL METHOD, RENDERING METHOD, AND STORAGE MEDIUM

(75) Inventor: Morikazu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 13/082,802

(22) Filed: Apr. 8, 2011

(65) Prior Publication Data

US 2011/0255098 A1    Oct. 20, 2011

(30) Foreign Application Priority Data

Apr. 15, 2010 (JP) .................................. 2010-094081

(51) Int. Cl.
*G06K 15/02* (2006.01)

(52) U.S. Cl.
USPC ............. 358/1.2; 358/1.9; 358/518; 345/589; 345/620; 382/167; 382/266; 382/274

(58) Field of Classification Search
USPC .................... 358/1.2, 1.9, 518; 345/589, 620; 382/167, 266, 274
See application file for complete search history.

(56) References Cited

U.S. PATENT DOCUMENTS

| 6,828,985 | B1 * | 12/2004 | Long et al. | ..................... 345/620 |
| 2004/0189656 | A1 * | 9/2004 | Moore | ......................... 345/589 |

FOREIGN PATENT DOCUMENTS

JP        2005-275668 A    10/2005

\* cited by examiner

*Primary Examiner* — Jacky X Zheng
(74) *Attorney, Agent, or Firm* — Canon U.S.A., Inc. IP Division

(57) ABSTRACT

An apparatus includes, in a case of performing rendering based on print data in which a plurality of objects for which a clip is not set are defined, and rendering an object on a predetermined scan line, which is a scan line subsequent to the scan line whose edge information has undergone edge processing, an update unit configured to read edge information about a predetermined page clip edge on the predetermined scan line, and set a predetermined clip count corresponding to the predetermined page clip edge to valid, and set a clip count corresponding to the different page clip edge to valid, and a rendering unit configured to render an object corresponding to both page clip edges after the predetermined clip count and the different page clip edge are set to valid.

18 Claims, 12 Drawing Sheets

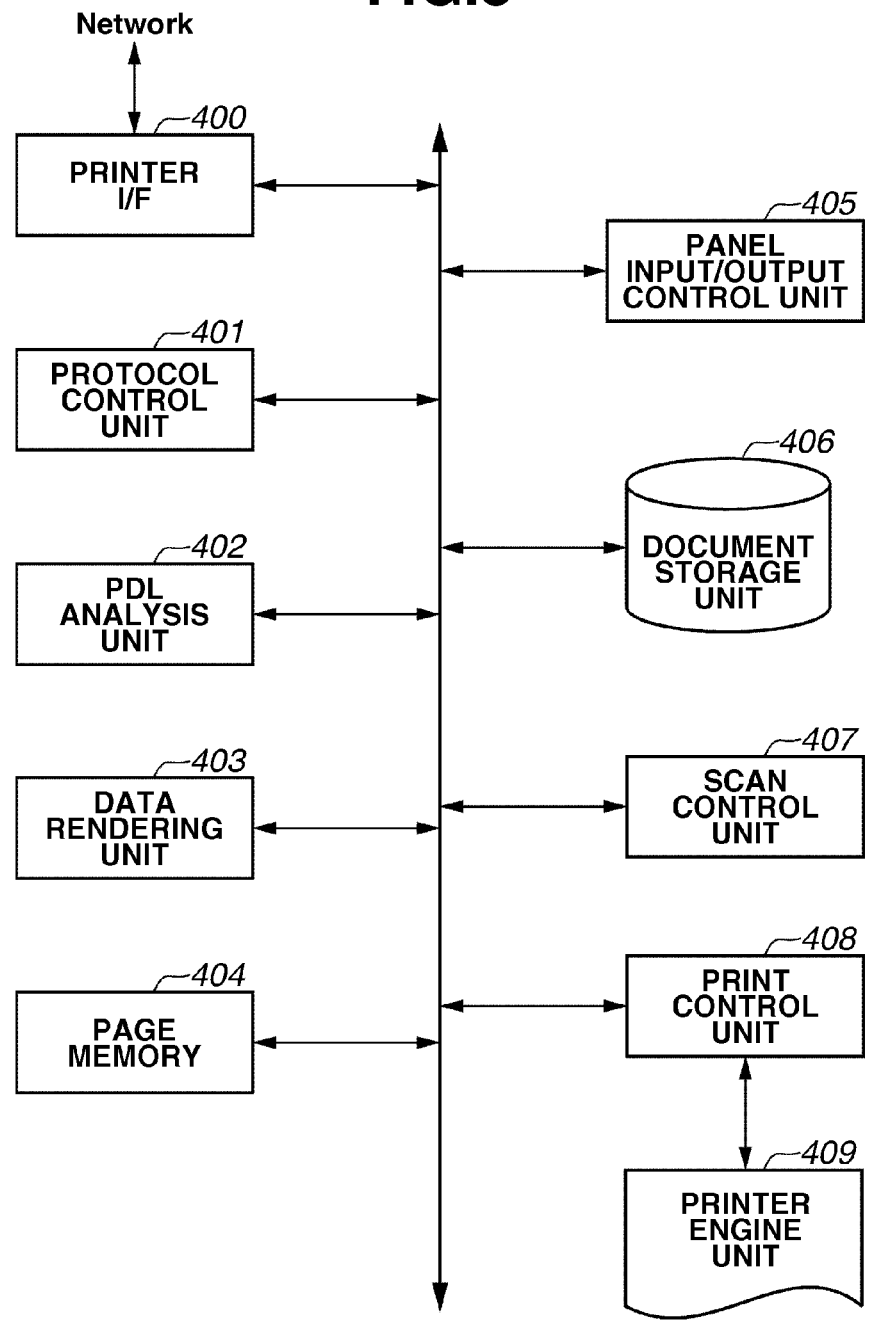

STATE-CENTRIC
[START] → [SET STATUS] → [RENDER OBJECT WITHOUT STATUS]
→ [RELEASE STATUS] → [END]

OBJECT-CENTRIC
[START] → [RENDER OBJECT WITH STATUS] → [END]

PAGE CLIP AND EDGE/LEVEL PROCESSING

EDGE INFORMATION EXAMPLE
- LINK TO NEXT EDGE
- LINK TO PREVIOUS EDGE
- CURRENT X COORDINATE
- LEVEL NUMBER ASSOCIATED WITH EDGE
- OTHER EDGE INFORMATION
- VARIOUS EDGE INFORMATION

LEVEL INFORMATION EXAMPLE
- LEVEL NUMBER
- FILL COUNT
- CLIP COUNT
- OTHER LEVEL INFORMATION

RENDERING APPARATUS HAVING A DISPLAY LIST CLIP PROCESSING CONTROL METHOD, RENDERING METHOD, AND STORAGE MEDIUM

BACKGROUND OF THE INVENTION

1. Field of the Invention

The present invention relates to a rendering apparatus having a display list clip processing control method, a rendering method, and a storage medium.

2. Description of the Related Art

Two types of methods for rendering print data exist, that is, state-centric and object-centric.

Japanese Patent Application Laid-Open No. 2005-275668 discusses a state-centric rendering method. In state-centric rendering, before rendering an object, the status concerning rendering is set for a page, and then the object is rendered. In the state-centric rendering, once set, the status is valid until all objects are rendered.

In an object-centric rendering method, if an attempt is made to render an object whose status has not been set, a default value is set for that object. To illustrate this, a clip will be described as an example. If a clip designation is NULL, the clip is set for the whole page of the display list. Further, in object-centric rendering, the status set for the object is released every scan line. A clip that is set for a whole page is referred to as a "page clip".

SUMMARY OF THE INVENTION

According to an aspect of the present invention, an apparatus is configured to set, a clip for a first object and a clip for the second object for a page in which both objects are defined, perform edge processing for an edge scan line on edge information about a first page clip edge corresponding to the first object clip, edge information about a second page clip edge corresponding to the second object clip, edge information about an edge of the first object, and edge information about an edge of the second object, set, for the edge scan line, a first clip count corresponding to the first page clip edge and a second clip count corresponding to the second page clip edge to valid by reading edge information about the first page clip edge and the second page clip edge, and render the first object after the first clip count is set to valid, and render the second object after the second clip count is set to valid. The apparatus includes in a case of performing rendering based on print data in which a plurality of objects for which a clip is not set are defined, and rendering an object on a predetermined scan line, which is a scan line subsequent to the edge scan line, an update unit configured to read edge information about a predetermined page clip edge on the predetermined scan line, and set a predetermined clip count corresponding to the predetermined page clip edge to valid, and set a different clip count corresponding to a different page clip edge to valid, and a rendering unit configured to render an object corresponding to both page clip edges after the predetermined and the different clip count are set to valid.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a block diagram illustrating a configuration of controller software according to an exemplary embodiment.

DESCRIPTION OF THE EMBODIMENTS

Figure 1:
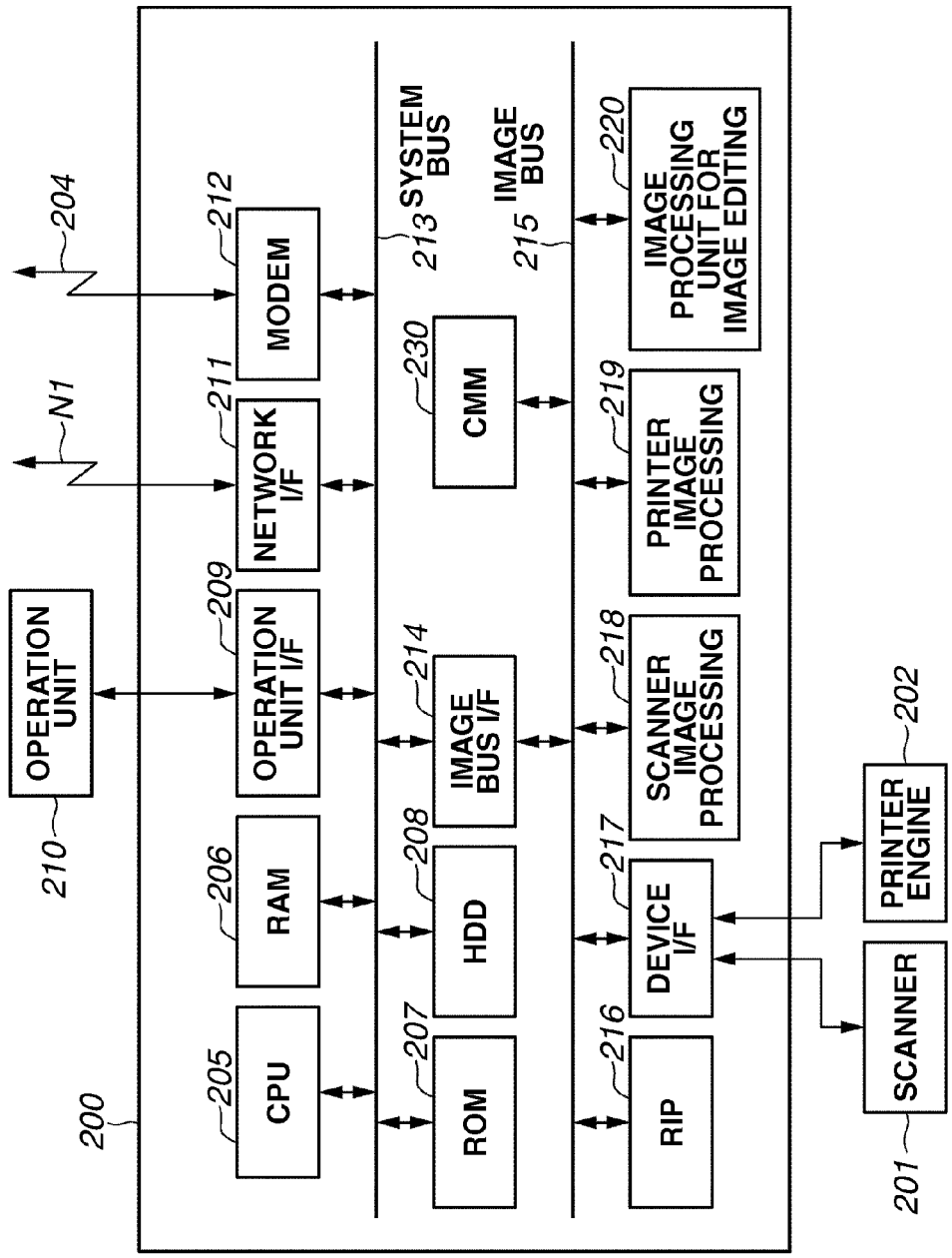
FIG. 1 is a block diagram illustrating a configuration example of a control unit for each device according to an exemplary embodiment.

Various exemplary embodiments, features, and aspects of the invention will be described in detail below with reference to the drawings.

Object-centric rendering has the following problems, which will be described in detail below.

A rendering apparatus performs processing for converting a page description language (PDL) input from an external device into a display list. Normally, a plurality of objects is defined in the PDL. If, for example, a clip has not been set for the plurality of objects, there will be a plurality of page clips in the display list.

If the level of the plurality of objects is the same, the plurality of objects can be subjected to processing that treats the plurality of objects as a single object during display list generation. Consequently, the page clips can be deleted. However, if the level of the plurality of objects is different, the plurality of objects cannot be processed as a single object. Consequently, it is impossible to delete the plurality of page clips corresponding to the plurality of objects.

Therefore, if a PDL which has a non-designated clip and which includes a large amount of objects having different levels is converted into a display list, a display list will be generated that includes a large amount of page clips.

Although these page clips are not required in order to perform rendering processing, they are taken into consideration when rendering an object, which means that it takes time to perform the rendering processing. This problem can occur for all PDLs.

Thus, the present invention is directed to providing a rendering apparatus capable of rendering a plurality of objects while only considering one clip edge.

A best mode for carrying out the present invention will now be described using the drawings.

The configuration of a 1D color multifunction peripheral (MFP), which is a suitable rendering apparatus to which the present exemplary embodiment may be applied will now be described.

The 1D color system MFP is configured from a scanner unit, a laser exposure unit, a photosensitive drum, an image forming unit, a fixing unit, a sheet feeding/conveyance unit, and a not-illustrated printer control unit that controls these units. The scanner unit is a unit for producing image data by optically reading a document image by irradiating with light a document that is placed on a document positioning plate, and converting the read image into an electric signal. A light beam such as laser light modulated based on the image data is reflected on a rotational polygon mirror (polygon mirror) rotating at a constant angular velocity. The laser exposure unit irradiates the photosensitive drum with a reflected scanning light.

The image forming unit forms an image by executing following electrophotographic processes. Namely, the image forming unit rotationally drives the photosensitive drum, charges the photosensitive drum with a charging device, and develops a latent image formed on the photosensitive drum by the laser exposure unit with toner, and transfers that toner image onto a sheet. Further, the image forming unit also recovers the small amount of toner that during the above processes was not transferred and remains on the photosensitive drum. During image formation, the sheet is rotated four times being wrapped on a predetermined portion of a transfer belt, and the respective development units (development stations) having a magenta (M), a cyan (C), a yellow (Y), and a black (K) toner repeat the above-described electrophotographic process in turn one after another. After four rotations, a sheet having a full-color-toner image of four colors transferred thereon leaves the transfer drum, and is conveyed to the fixing unit.

The fixing unit is configured from a combination of rollers and belts, and includes a heat source such as a halogen heater. The fixing unit fixes the toner onto the sheet on which the toner image was formed by the image forming unit, by dissolving the toner with heat and pressure.

The sheet feeding/conveyance unit has one or more sheet storage units represented by a sheet cassette or a paper deck. The sheet feeding/conveyance unit separates one sheet from among a plurality of sheets stored in the sheet storage units based on an instruction from the printer control unit, and conveys the sheet to the image forming unit and the fixing unit. The sheet is wrapped around the transfer drum of the image forming unit, rotated four times, and then conveyed to the fixing unit. The above-described YMCK four-color toner images are transferred onto the sheet during the four rotations of the sheet. When forming an image on both sides of the sheet, the sheet that has passed through the fixing unit is caused to again travel along a conveyance passage to be conveyed to the image forming unit.

The printer control unit communicates with the MFP control unit that controls the whole MFP, and executes control based on the instructions therefrom. Further, the printer control unit issues instructions so that the whole system can operate smoothly and in harmony while managing the state of the scanner unit, the laser exposure unit, the fixing unit, and the sheet feeding/conveyance unit.

FIG. 1 is a block diagram illustrating a configuration example of a MFP control unit (controller) according to the present exemplary embodiment. In FIG. 1, a control unit 200 is connected to a scanner 201, which is an image input device, and to a printer engine 202, which is an input output device. The control unit 200 performs control for image data reading and print output. Further, the control unit 200 is connected to a local area network (LAN) N1 and a public line 204, which allows it to perform control for outputting image information and device information via the LAN N1. The printer engine 202 is connected to a device I/F 217, and performs processing for outputting rendering data generated by the control unit 200 onto a sheet of paper.

A central processing unit (CPU) 205 controls the entire MFP. A random access memory (RAM) 206 is a system work memory that is operated by the CPU 205, and is also an image memory for temporarily storing the input image data. Further, a read-only memory (ROM) 207 is a boot ROM, in which a system boot program is stored. A hard disk drive (HDD) 208 stores, for example, system software for various processes and the input image data. An operation unit 210 has a display screen on which image data can be displayed. An operation unit interface (I/F) 209 is an interface unit that interfaces with the operation unit 210 to output operation screen data to the operation unit 210. Further, the operation unit I/F 209 plays the role of transmitting information input by an operator from the operation unit 210 to the CPU 205. A network I/F 211 is realized by, for example, a LAN cable. The network I/F 211 performs input/output of information to and from an external device connected to the LAN N1. In addition, a modem 212 is connected to the public line 204. The modem 212 also performs input/output of information to and from an external device connected to the LAN N1. The above units are arranged on a system bus 213.

An image bus I/F 214 is an interface for connecting the system bus 213 with an image bus 215, which transfers the image data at a high speed. The image bus I/F 214 is a bus bridge for converting the data structure. A raster image processor 216, a device I/F 217, a scanner image processing unit 218, a printer image processing unit 219, an image processing unit for image editing 220, and a color management module 230 are connected to the image bus 215.

The raster image processor (RIP) 216 rasterizes a page description language (PDL data) code and below-described vector data into an image. The device I/F 217 connects the scanner 201 and the printer engine 202 with the control unit 200, and performs synchronous/asynchronous conversion of the image data.

The scanner image processing unit 218 performs various processes, such as correction, retouching, and editing, on the image data input from the scanner 201. The printer image processing unit 219 performs processing such as correction and resolution conversion according to the printer engine on the image data to be printed out. The image processing unit for image editing 220 performs various image processes, such as rotation of the image data and compression/decompression processing of the image data. The CMM 230 is a dedicated hardware module that performs color conversion processing (also called color space conversion processing) on the image data based on a profile or calibration data. A "profile" is information like a function for converting color image data expressed in terms of a color space that is dependent on a device into a color space that is device-independent (e.g., Lab etc.). Calibration data is data for correcting a color reproduction characteristic of the scanner 201 and the printer engine 202 in a color MFP 3.

Figure 2:
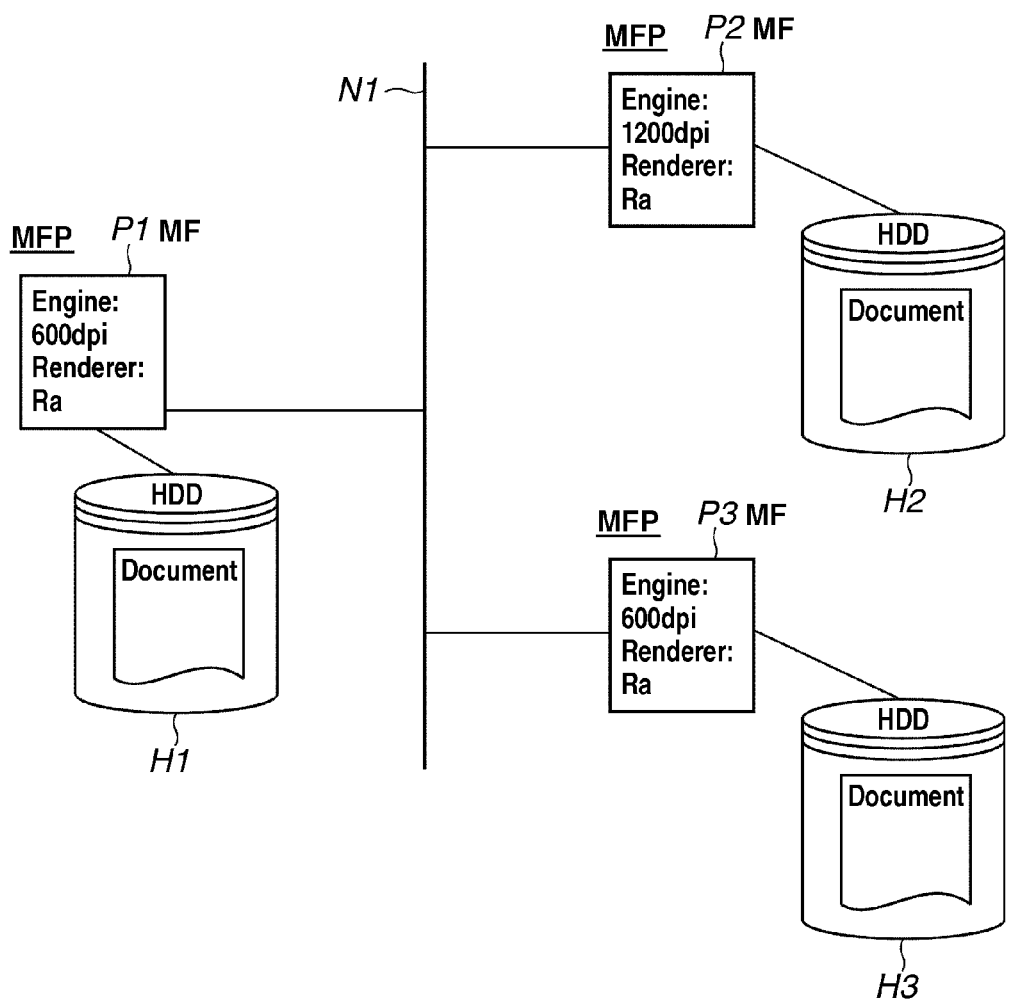
FIG. 2 illustrates a system configuration according to an exemplary embodiment.

FIG. 2 is a block diagram illustrating the overall configuration of the image processing system configuration according to the present exemplary embodiment. In FIG. 2, the image processing system is configured from a MFP 1, a MFP 2, and a MFP 3, which are connected to each other via the LAN N1, for example.

Each of the MFPs includes a HDD (secondary storage device) H1, H2, and H3, respectively. The resolution of the printer engine (hereinafter, "engine") mounted on the MFPs is not the same for all the MFPs. MFP 1 and MFP 2 are 600 dpi, and MFP 3 is 1,200 dpi. Further, the type of renderer (rasterizer) mounted on the MFPs is not the same for the MFPs. The renderer in MFPs 1 and 2 is the same type (in FIG. 2, represented as "Ra"), while MFP 3 has a different type (represented as "Rb"). Since a renderer is generally configured from hardware such as an application-specific integrated circuit (ASIC), different renderer types cannot process different types of rendering command groups. These rendering command groups are generally referred to as a "display list". A display list is an instruction that can be processed by hardware. Display lists are generated by software from vector data having a complex rendering description, and are resolution-dependent.

The MFP 1, the MFP 2, and the MFP 3 can communicate with each other using a network protocol. The arrangement of these MFPs connected via the LAN N1 is not limited to a physical arrangement such as that described above. Further, a device other than an MFP (e.g., a personal computer (PC), various types of servers, a printer etc.) can also be connected to the LAN N1.

FIG. 3 is a block diagram illustrating a configuration of controller software for controlling MFP operation.

A printer interface 400 is a unit for input/output to and from an external device. A protocol control unit 401 is a unit for performing communication with an external device by analyzing/transmitting a network protocol.

A PDL data analysis unit 402 is a unit that analyzes PDL data for conversion into a display list in a format that is easier to process. The display list generated by the PDL data analysis unit 402 is transferred to a data rendering unit 403 for processing. The data rendering unit 403 rasterizes the display list into bitmap data, and successively renders the rasterized bitmap data into a page memory 404. The PDL data analysis unit 402 and the data rendering unit 403 are realized when respective programs are loaded into the memory and executed by the CPU.

The page memory 404 is a volatile memory for temporarily storing the bitmap data rasterized by the renderer. A panel input/output control unit controls the input/output to and from an operation panel. A document storage unit 406 is a unit for storing a data file. This document storage unit 406 is realized by a secondary storage device, such as a hard disk.

A scan control unit 407 performs various processes, such as correction, retouching, and editing, on the image data input from the scanner. A print control unit 408 converts the contents of the page memory 404 into a video signal, and transfers the video signal to a printer engine unit 409. The printer engine unit 409 is a printing mechanism for forming a visible image on a recording sheet from the received video signal.

<PDL Processing Method in which the Present Invention can be Applied and Other PDL Processing Methods>

FIG. 4 illustrates differences between a state-centric rendering method and an object-centric rendering method to which the present invention can be applied.

Figure 4A:
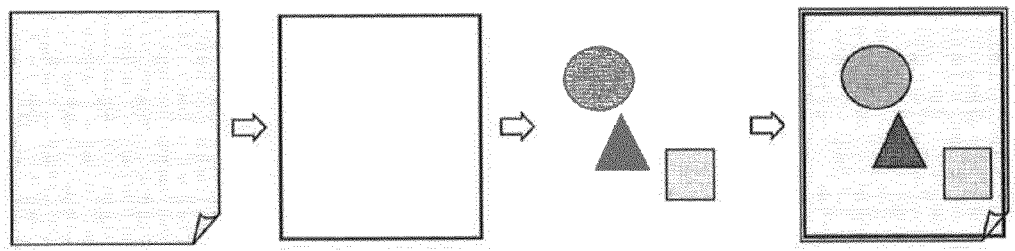
FIG. 4 illustrates a PDL print processing method according to an exemplary embodiment.

In state-centric rendering, as illustrated in FIG. 4A, before rendering an object, the status concerning rendering is set, and then the object is rendered. In state-centric rendering, once set, the status is valid until released. Consequently, only one page clip is generated.

Figure 4B:
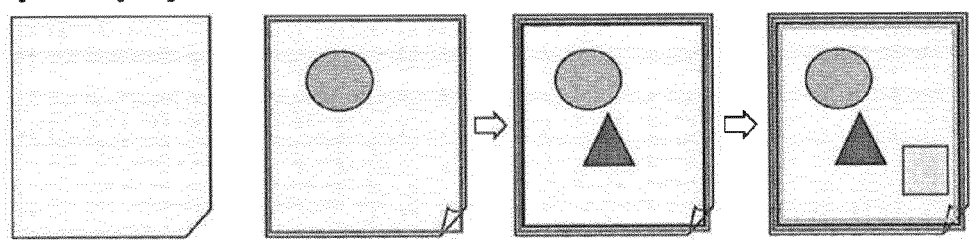

On the other hand, in object-centric rendering, as illustrated in FIG. 4B, objects with status are successively rendered. If, for example, a clip has not been set for an object, there is at least a possibility that there is only the same number of page clips as objects.

Although state-centric rendering is mainly employed in systems such as low-performance CPUs and low-capacity memories, object-centric rendering is often used in systems such as high-performance CPUs and large-capacity memories. An advantage of state-centric rendering is that, as described above in the related art, once set, the status remains valid until released. Accordingly, unnecessary page clips are not generated. On the other hand, an advantage of object-centric rendering is that maintenance of the specification for setting the status for each object is simple, easy to debug, and easy to handle during multi-CPU operation.

<Page Clip, Edge, and Level Processing During Rendering>

The page clip edge, edge, and level processing performed during rendering will now be described using FIG. 5. This processing is executed by the data rendering unit 403.

First, the term "edge" refers to a boundary line between two objects to be rendered in a page, or between an object and a background. "Page clip" is also treated as one type of edge.

Edge processing refers to the five basic processes of: (1) loading edge information into a memory; (2) calculating an X coordinate on the scan line currently being processed; (3) updating a link that stores the order in which edges appear based on the X coordinates; (4) calculating the distance between the edge currently being processed and an adjacent edge; and (5) deleting edge information. The edge information includes items such as those in the box in FIG. 5.

Next, the term "level" refers to the hierarchical relationship among the objects to be rendered in the page. A level number is always assigned to each object. Level processing refers to the following basic four processes: (1) if a rendering object edge appears, updating the fill count for determining whether to fill or not based on the direction of the edge. For example, if an initial value is 0, and for an up edge, minus 1 or for a down edge, plus 1, the object is to be rendered unless the fill count is 0; (2) if a clip edge appears, updating the clip count for determining whether the object to be rendered relates to the clip. For example, if an initial value is 1, and for an up edge, minus 1 or for a down edge, plus 1, the object is to be rendered if the clip count is 0; (3) determining whether an object is a rendering target based on the clip count and the fill count; and (4) sorting for rearranging the order based on the level number of the rendering target objects.

Figure 5:
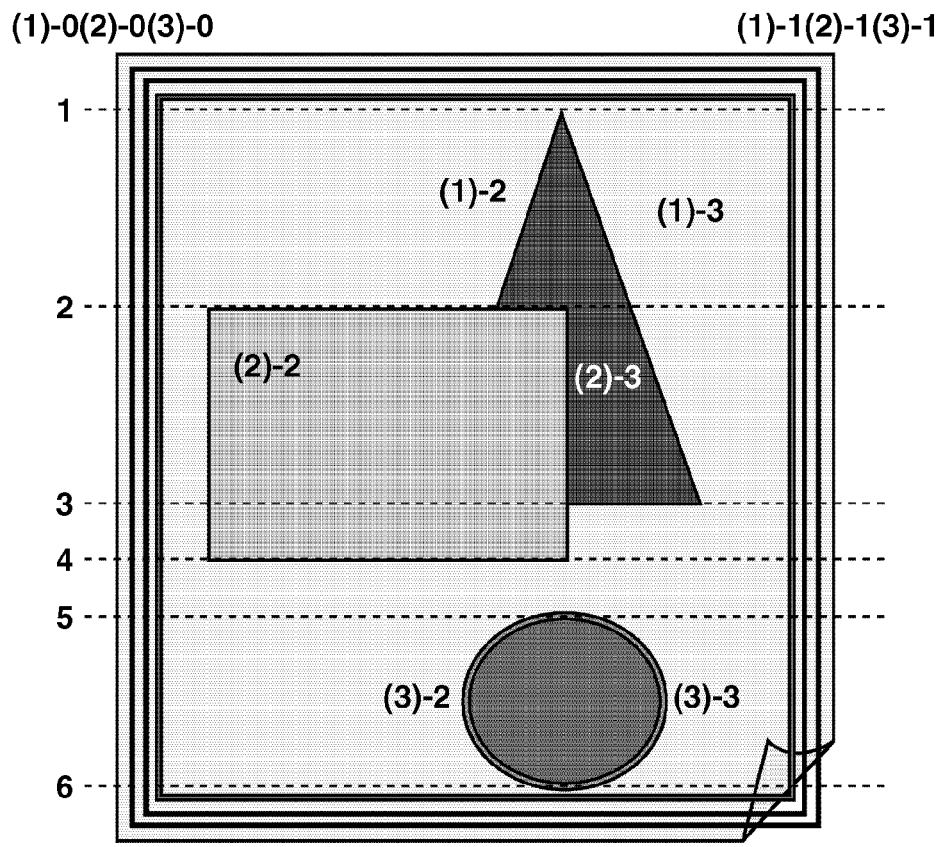
FIG. 5 illustrates page clip, edge, and level processing according to an exemplary embodiment.

In FIG. 5, a circular, a triangular, and a rectangular object are drawn. The edge processing is performed line by line from the top of the page toward the bottom. The circular object is a first object, and the triangular object is a second object. In FIG. 5, since a clip is not set for the first or second objects, a clip for both objects is set for the page in which both objects are defined. Thus, the edge of the clip with respect to the page is called a page clip edge. The page clip edge corresponding to the clip of the first object is called a first page clip edge, and the page clip edge corresponding to the clip of the second object is called a second page clip edge. These page clip edges are treated as edges similarly to the edge of the first object and the edge of the second object.

First, the display list of the page illustrated in FIG. 5 is loaded into the memory. Next, on the top of the page, since the up edge (1)-0, (2)-0, (3)-0 of the page clip edge appears at the upper left of the page and the down edge (1)-1, (2)-1, (3)-1 of the page clip edge appears at the upper right of the page, information about each edge is loaded into separate regions of the memory. FIG. 5 shows that there are three page clip edges on the left and the right sides respectively. Although the three page clip edges in FIG. 5 are drawn so as not to overlap with each other, in actual practice, the edges start from the same X and Y coordinates.

Since a page clip edge is treated in the same way as an ordinary edge, these page clip edges are linked in the order of (1)-0→(2)-0→(3)-0→(1)-1→(2)-1→(3)-1. The clip edge (1) is the clip relating to the triangular object, the clip edge (2) is the clip relating to the rectangular object, and the clip edge (3) is the clip relating to the circular object. Further, the clip edge (1) is the first page clip edge and the clip edge (2) is the second page clip edge.

Edge information about each edge is sent to the level processing unit. Then, (1)-0 and (1)-1 update the clip count of the triangular object, (2)-0 and (2)-1 update the clip count of the rectangular object, and (3)-0 and (3)-1 update the clip count of the circular object. For example, the level processing unit reads the edge information of the first page clip edge (up edge), and sets the clip count corresponding to the first page clip edge to valid. Further, the level processing unit reads the edge information of the second page clip edge (up edge), and sets the clip count corresponding to the second page clip edge to valid. Conversely, when the down edge of the first page clip edge or the second page clip edge is read, the respective clip count is set to invalid.

In FIG. 5, since edge information about the edges of each object is not loaded for the scan lines in which edge information about the page clip edge is loaded, the fill count is 0. Therefore, there is no rendering target object on the scan lines in which edge information about the page clip edge is loaded. If a first object and a second object exist, the first and second objects are rendered after the clip counts of the first and second page clip edges have been set to valid.

The above processing is performed from the top line of the page until the line numbered 1. At line 1, the up edge (1)-2 and the down edge (1)-3 appear, each piece of edge information is loaded into the memory, and the X coordinates are calculated. The links at this point are (1)-0→(2)-0→(3)-0→(1)-2→(1)-3→(2)-1→(3)-1.

Each edge is sent to the level processing unit. Then, (1)-0 and (1)-1 update the clip count of the triangular object, (2)-0 and (2)-1 update the clip count of the rectangular object, and (3)-0 and (3)-1 update the clip count of the circular object. Further, (1)-2 and (1)-3 update the fill count of the triangular object. The fill count of the triangular object at the section narrowed to (1)-2, (1)-3 is −1, and the clip count is 0, so that this object becomes the rendering target. In this case, since there is only one rendering target object, sorting is not performed.

The above processing is repeated from line 1 to line 2. At line 2, the up edge (2)-2 and the down edge (2)-3 appear, each piece of edge information is loaded into the memory, and the X coordinates are calculated. The links at this point are (1)-0→(2)-0→(3)-0→(2)-2→(1)-2→(2)-3→(1)-3→(1)-1→(2)-1→(3)-1.

Each edge is sent to the level processing unit. Then, (1)-0 and (1)-1 update the clip count of the triangular object, (2)-0 and (2)-1 update the clip count of the rectangular object, and (3)-0 and (3)-1 update the clip count of the circular object. Further, (2)-2 and (2)-3 update the fill count of the rectangular object, and (1)-2 and (1)-3 update the fill count of the triangular object. The fill count of the rectangular object at the section nipped by (1)-2, (1)-2, is −1, and the clip count is 0 (valid), so that this object becomes the rendering target. In this case, since there is only one rendering target object, sorting is not performed. The fill count of both the triangular object and the rectangular object at the section nipped by (1)-2, (1)-3, is −1, and the clip count is 0, so that this object becomes a rendering target. In this case, a comparison of the level numbers of each object shows that the rectangular object has a larger level number. Therefore, the rectangular object becomes the rendering target. Next, the fill count of the triangular object at the section nipped by (2)-3, (1)-3, is −1, and the clip count is 0, so that this object becomes the rendering target. In this case, since there is only one rendering target object, sorting is not performed.

The above processing is repeated from line 2 to line 3. At line 3, since (1)-2, (2)-3 are deleted, the links are (1)-0→(2)-0→(3)-0→(2)-2→(2)-3→(1)-1→(2)-1→(3)-1. The same processing is repeated for the subsequent scan lines and performed until the last line on the page. The above description has illustrated the flow of the basic page clip, edge, and level processing performed during rendering.

Figure 6:
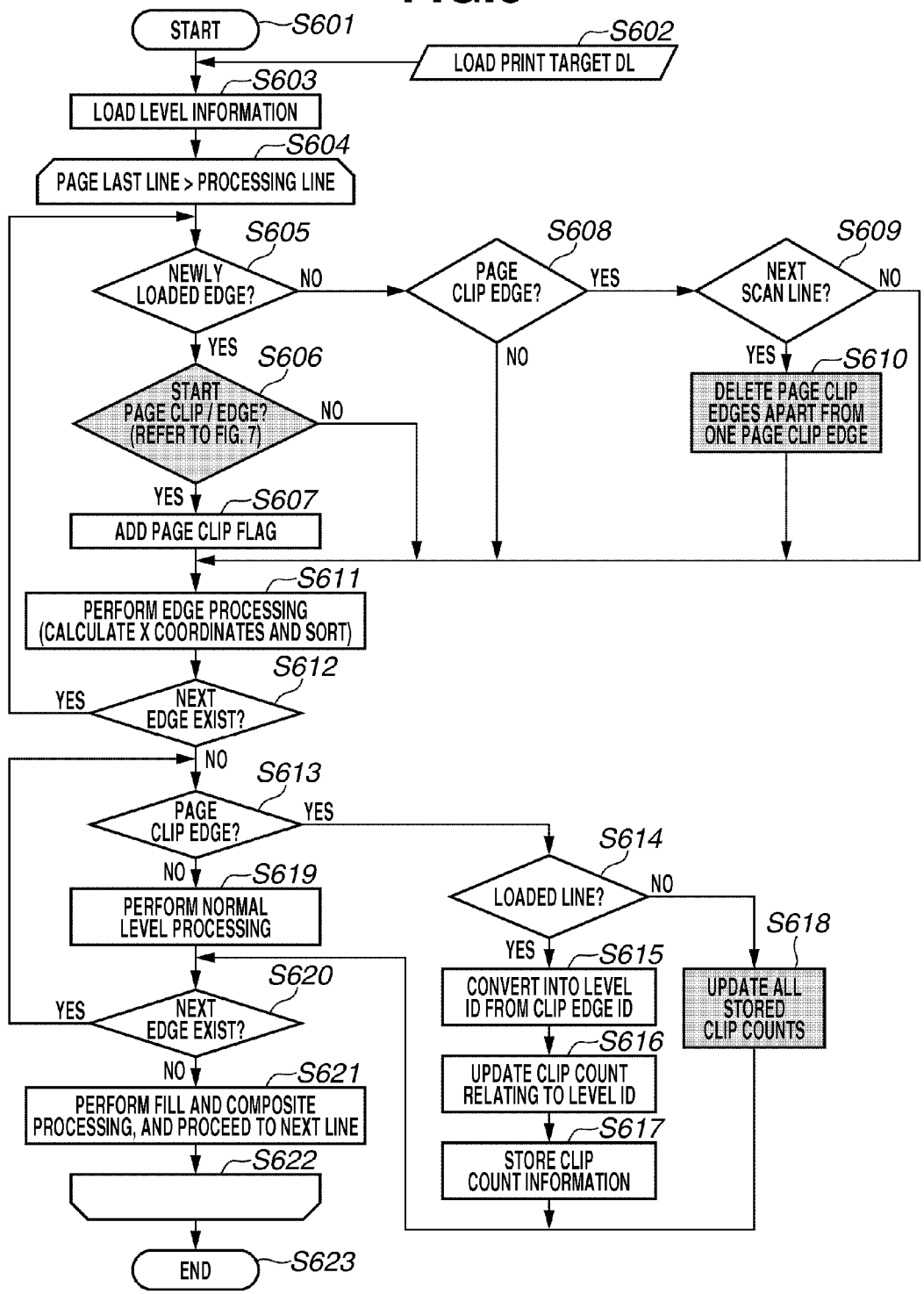
FIG. 6 is a flowchart illustrating page clip processing according to an exemplary embodiment.

Next, the flow of the rendering processing according to the present exemplary embodiment will be described using FIG. 6. This processing is executed by the data rendering unit 403.

Step S601 indicates the start of this processing. Step S602 represents a corresponding display list on which the print processing is to be performed. In step S602, the display list is loaded into the memory. In step S603, level information included in the display list is loaded into the memory. Step S604 is a scan line loop limit, in which the processing returns from step S622 to this loop limit after each scan line is processed. This loop is repeated until the scan line to be processed is the last scan line.

In step S605, the data rendering unit 403 determines whether the edge to be processed is edge information newly loaded into the memory. Edge information that is newly loaded into the memory is stored by the same memory. If it is determined that the edge is edge information newly loaded into the memory (YES in step S605), in step S606, the data rendering unit 403 determines whether the loaded edge information is a page clip edge. The processing performed in this step will be described in more detail in "Page Clip Edge Determination Processing Flow". If it is determined that the loaded edge information is a page clip edge (YES in step S606), in step S607, a flag indicating that the edge loaded in step S605 is a page clip is added.

If it is determined that the loaded edge information is not a page clip edge (NO in step S606), the processing proceeds to step S611. If it is determined that the edge is not edge information newly loaded into the memory (NO in step S605), in step S608, the data rendering unit 403 determines whether the loaded edge is a page clip edge. If it is determined that the loaded edge is not a page clip edge (NO in step S608), the processing proceeds to step S611. If it is determined that the loaded edge is a page clip edge (YES in step S608), in step S609, the data rendering unit 403 determines whether, among the scan lines loaded by the page clip edge, the scan line to be rendered is the next scan line. Based on this determination result, if it is determined that the scan line to be rendered is the next scan line (YES in step S609), in step S610, the data rendering unit 403 leaves the edge information about one page clip edge, and deletes the edge information about the other page clip edges from the memory. Then, the processing proceeds to step S611.

If it is determined that the scan line to be rendered is not the next scan line (NO in step S609), the processing proceeds to step S611. In step S611, the data rendering unit 403 calculates the X coordinate of the line currently being processed for each edge, and sorts the edges. Next, in step S612, the data rendering unit 403 determines whether there is a next edge in the line currently being processed. If it is determined that there is a next edge (YES in step S612), the processing returns to step S605, and the above processing is repeated. If it is determined that there is not a next edge (NO in step S612), the data rendering unit 403 returns the processing target to the top edge of the line currently being processed. Then, in step S613, the data rendering unit 403 reads the edge to be processed, and determines whether the read edge is a page clip edge. If it is determined that the read edge is a page clip edge (YES in step S613), in step S614, the data rendering unit 403 determines whether the page clip edge, which is stored in the memory and was read in step S613, is a scan line in which a page clip edge is loaded.

If it is determined that this page clip edge is a scan line in which a page clip edge is loaded (YES in step S614), in step S615, the data rendering unit 403 converts the ID of this page clip edge into a level ID, and specifies the clip target object. Then, in step S616, the data rendering unit 403 updates the clip count of the object of the page clip edge target. Next, in step S617, the data rendering unit 403 stores the clip count managing the count updated in step S616, for use in the next and subsequent scan lines, and the processing proceeds to step S620. If it is determined that the page clip edge is not a scan line in which a page clip edge is loaded (NO in step S614), in step S618, the data rendering unit 403 updates the clip count corresponding to the read page clip edge and the clip count of all the other edges, and the processing proceeds to step S620. More specifically, the data rendering unit 403 sets all of the clip counts stored in step S617 to valid.

In step S620, the data rendering unit 403 determines whether there is a next edge in the scan line to be rendered. If it is determined that there is a next edge (YES in step S620), the processing returns to step S613, and the above processing is repeated. If it is determined that there is not a next edge (NO in step S620), in step S621, the data rendering unit 403 performs fill and composite processing, and proceeds to the next line. Fill processing refers to, when the object to be processed is an image, performing designated scaling and rotation, and for a brush in which the same color continues, generating data of relevant pixels. Further, composite processing is a raster operation performed between pixels, which is performed during rendering such as transmission. Step S622 serves as a loop limit for the scan line corresponding to step S604. If the processing corresponding to all of the scan lines is finished, in step S623, the rendering processing is finished.

Figure 7:
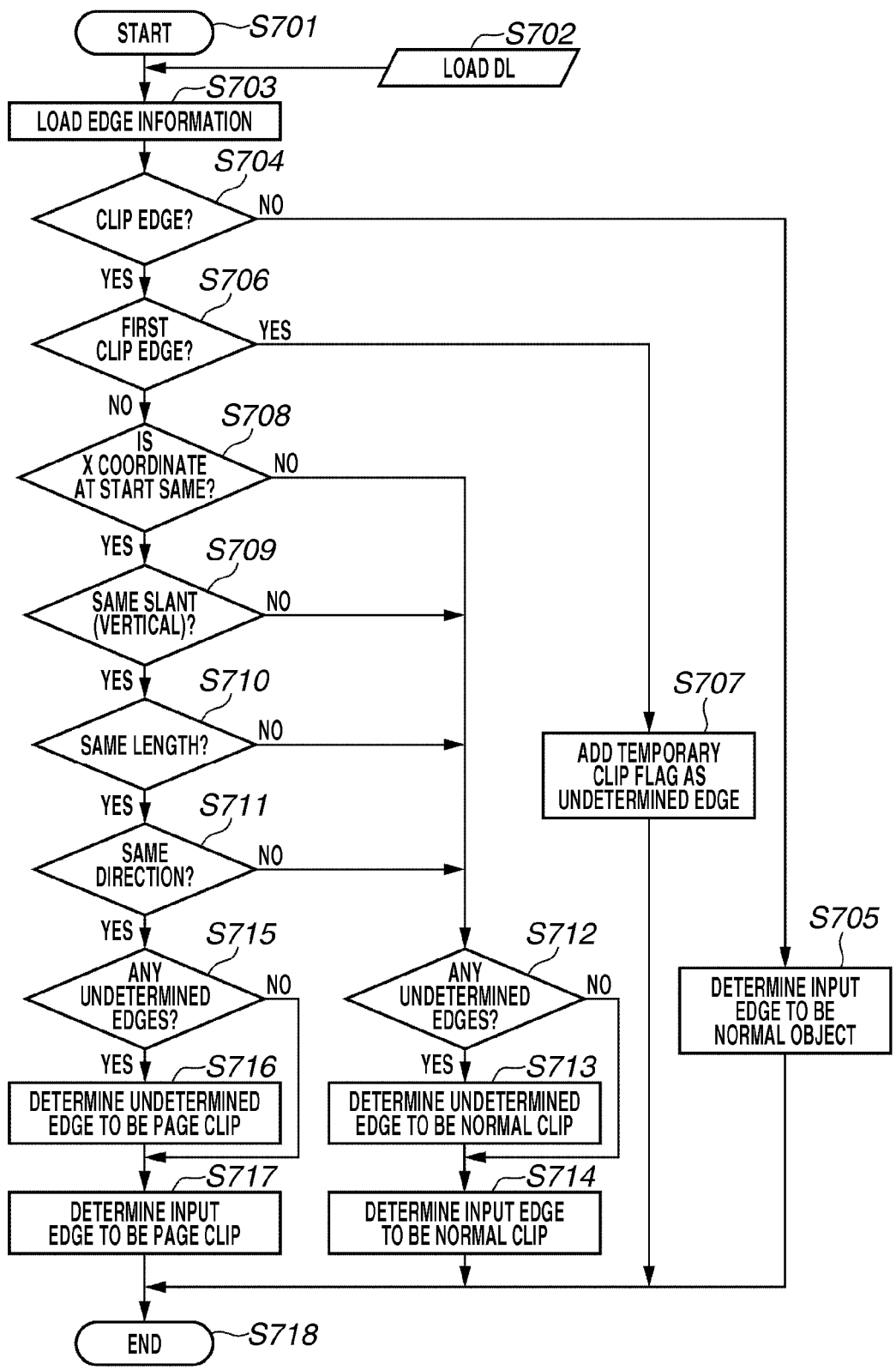
FIG. 7 is a flowchart illustrating processing for determining a page clip edge according to an exemplary embodiment.

Next, the flow of the page clip edge determination processing according to the present exemplary embodiment will be described using FIG. 7. This processing is executed by the data rendering unit 403.

Step S701 indicates the start of this processing. In step S702, a display list is loaded into the memory. In step S703, edge information is extracted from the display list and loaded into the memory. In step S704, the data rendering unit 403 determines whether an edge corresponding to the edge information loaded into the memory and read is a clip edge. If it is determined that this edge is not a clip edge (NO in step S704), in step S705, the data rendering unit 403 determines the loaded edge to be an edge of an object. The processing then proceeds to step S718, and is finished.

If it is determined that the edge is a clip edge (YES in step S704), in step S706, the data rendering unit 403 determines whether the edge corresponding to the read edge information is a first clip edge. If it is determined that this edge is a first clip edge (YES in step S706), in step S707, a temporary clip flag is added as an undetermined edge, and the processing proceeds to step S718. If it is determined that the edge is not a first clip edge (NO in step S706), in step S708, the data rendering unit 403 determines whether the start X coordinate of the read edge is the same as the start X coordinate of the clip edge stored in the memory. If it is determined that these start X coordinates are not the same (NO in step S708), the processing proceeds to step S712.

If it is determined that these start X coordinates are the same (YES in step S708), in step S709, the data rendering unit 403 determines whether the slant of the read edge is the same slant as the clip edge stored in the memory. If it is determined that these start X coordinates are not the same (NO in step S708), the processing proceeds to step S712. If it is determined that the slant is the same (YES in step S709), in step S710, the data rendering unit 403 determines whether the length of the read edge is the same length as the clip edge stored in the memory. If it is determined that the slant is not the same (NO in step S709), the processing proceeds to step S712. If it is determined that the length is the same (YES in step S710), in step S711, the data rendering unit 403 determines whether the direction of the read edge is the same direction as the clip edge stored in the memory. If it is determined that the direction is not the same (NO in step S711), the processing proceeds to step S712.

If it is determined that the direction is the same (YES in step S711), in step S715, the data rendering unit 403 determines whether there are any undetermined edges. If it is determined that there are no undetermined edges (NO in step S715), the processing proceeds to step S717. If it is determined that there is an undetermined edge (YES in step S715), in step S716, the data rendering unit 403 determines that the undetermined edge stored in the memory is a page clip edge. Then, in step S717, the data rendering unit 403 determines that the read clip edge is a page clip edge, and in step S718, the processing is finished. Further, in step S712, the data rendering unit 403 determines whether there are any undetermined edges. If it is determined that there are no undetermined edges (NO in step S712), the processing proceeds to step S714. If it is determined that there is an undetermined edge (YES in step S712), in step S713, the data rendering unit 403 determines that the undetermined edge is a normal clip edge. Then, in step S714, the data rendering unit 403 determines that the read edge is a normal clip edge, and in step S718, the processing is finished. In this way, the data rendering unit 403 detects page clips on the left and right of the page.

Processing of the scan line that is initially loaded by the page clip edge in steps S607 to S611 will now be described using FIG. 8. This scan line corresponds to a third scan line.

D801 indicates the scan line that is initially loaded by the page clip edge. FIG. 8 illustrates an example in which there are three page clips on the left and right, respectively. Although the edges actually start from the same X and Y coordinates, in FIG. 8, the page clips are slightly offset from each other so that it is easier to see that there are three page clips. The edge indicated by D802 on the left side of the page is an up edge, and the edge indicated by D803 on the right side of the page is a down edge.

First, as shown by D806, when the print processing starts, level information is loaded into the memory. At the third scan line loaded by the page clip edge, as shown by D805, edge information is loaded into the memory. The memory stores the loaded edge information.

Next, edge processing is performed, and the clip edge information (flag called "page clip edge", edge ID, edge direction etc.) is transmitted to the level processing unit. The level processing unit converts the edge ID into a level ID, specifies the level of the clip, and updates the clip count based on the edge direction. D804 illustrates the objects relating to that clip and an initial value of the clip count (CC) stored by the objects. Further, FIG. 8 illustrates the clip count at the left side of the page clip edge (PC), the clip count in the space sandwiched by the left and right page clips, and the clip count at the right side of the page clip edge. These clip counts are stored and updated in the memory relating to the level information of D806. In FIG. 8, not only is a circular page clip valid, but page clip edges different from the circular page clip are also valid. Examples of a different page clip edge include a triangular page clip edge.

In conventional processing, the above-described processing is performed not only on the third scan line, but is repeated for all of the scan lines. In the present exemplary embodiment, as shown in D807, a cache is generated and stored as a pointer to the clip counter for all of the objects relating to the page clip edges. Further, the circular and triangular shapes are rendered after the circular page clip edge and the different page clip edge, which is a triangular page clip edge, have been set to valid.

Processing of the next scan line after the scan line loaded by the page clip edge in steps S615 to S618 will now be described using FIG. 9. This scan line corresponds to a second scan line.

D901 indicates the next scan line that is loaded by the page clip edge. D902 illustrates a memory region in which the edge information about the page clip edge stored by the third scan line is stored. When the D902 page clip edge (two-dot chain line edge) is processed and a flag indicating that the edge is a page clip edge is sent, the level processing unit accesses D904, and updates the clip count of each object loaded in D903 based on the edge direction.

The clip count corresponding to a different page clip edge (dotted line edge) to D902 is set to valid when the clip count is updated by the first page clip edge. The data rendering unit 403 keeps the edge information about the above page clip edge (the two-dot chain line edge), and deletes the second edge (the dotted line edge) from the D902 memory. As described above, edge information about the third edge (the solid line on the left side) is deleted from the memory. Further, the circular object and the triangular object are rendered after the clip count of the page clip edge (dotted line edge) different from the page clip edge (the two-dot chain line edge) has been set to valid.

Processing of the second and subsequent lines following the scan line loaded by the page clip edge will now be described using FIG. 10. This scan line corresponds to the first scan line.

D1001 indicates the scan line that is two scan lines after the third scan line loaded by the page clip edge. In D1002, since the left/right dotted line edge information and the left/right solid line edge information were deleted from the memory, only the left/right two-dot chain line edge information remains. The data rendering unit 403 reads the page clip edge information about the dotted line edge, does not read the edge information about the solid line page clip edge, and sets the clip count of the dotted line edge and the clip count of the solid line edge to valid. After both clip counts have been set to valid, the circular object and the triangular object are rendered.

Figure 8:
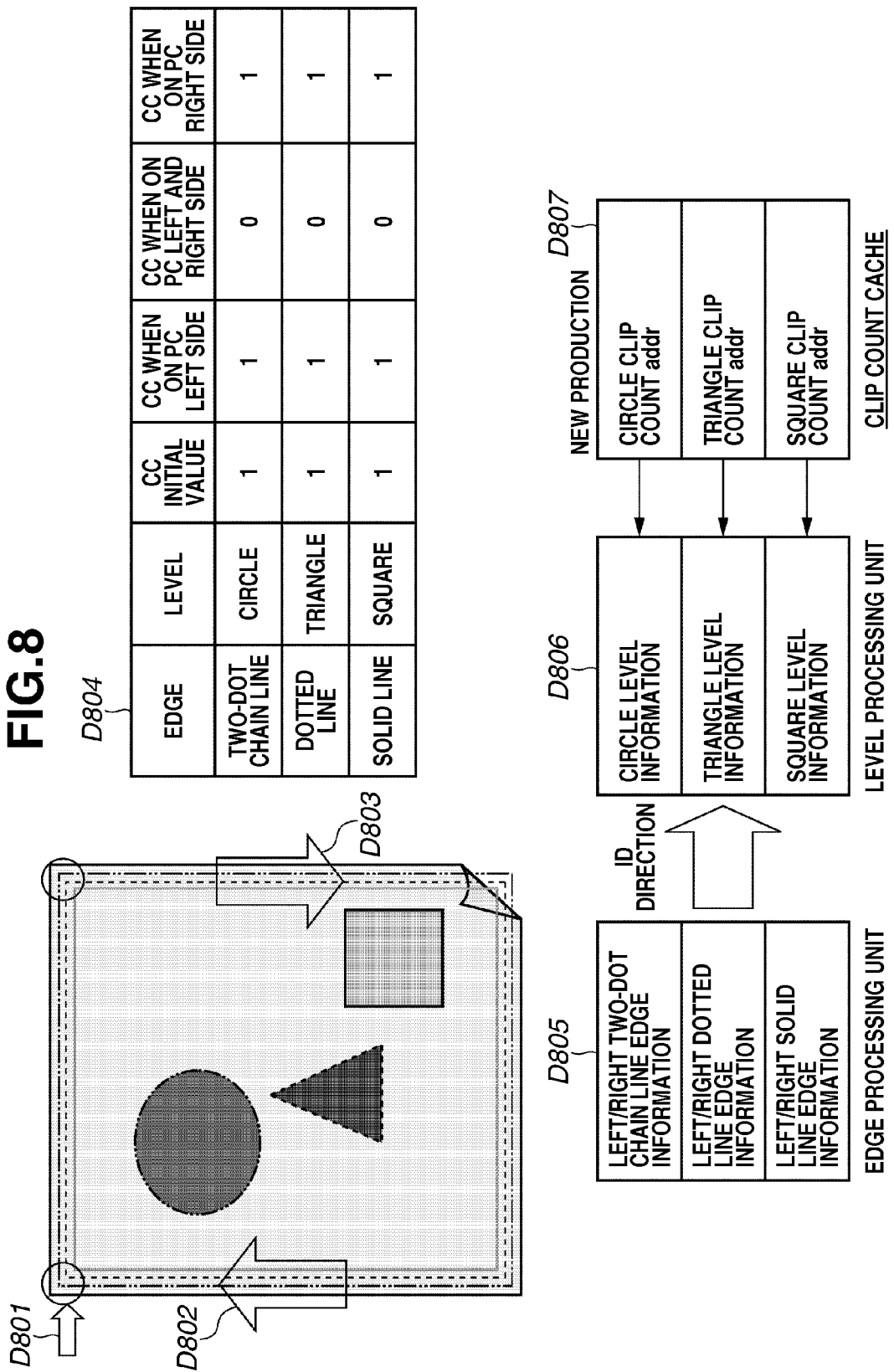
FIG. 8 illustrates processing of a line in which a page clip appeared according to an exemplary embodiment.
Figure 9:
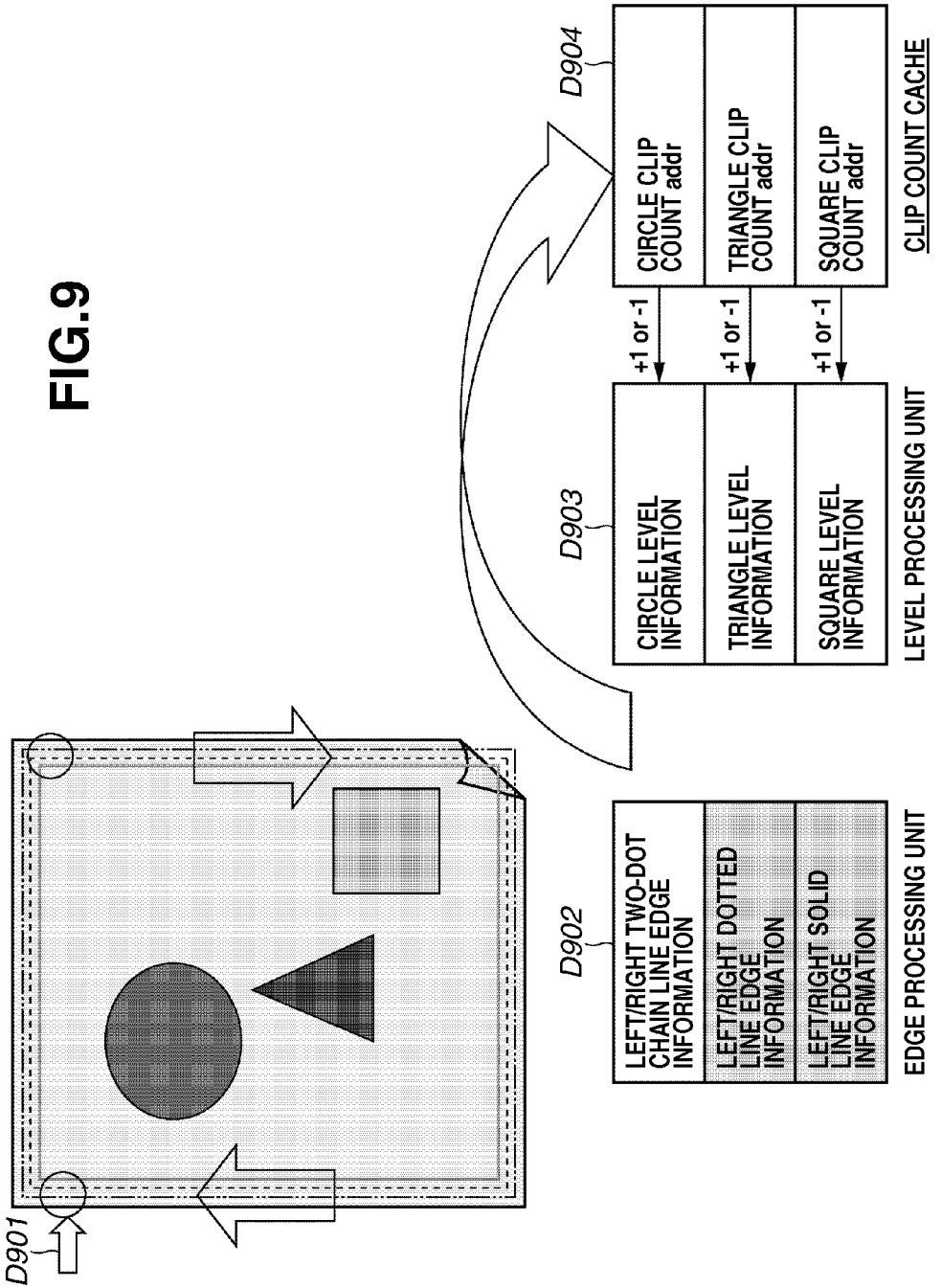
FIG. 9 illustrates processing of the next line after the line in which a page clip appeared according to an exemplary embodiment.
Figure 10:
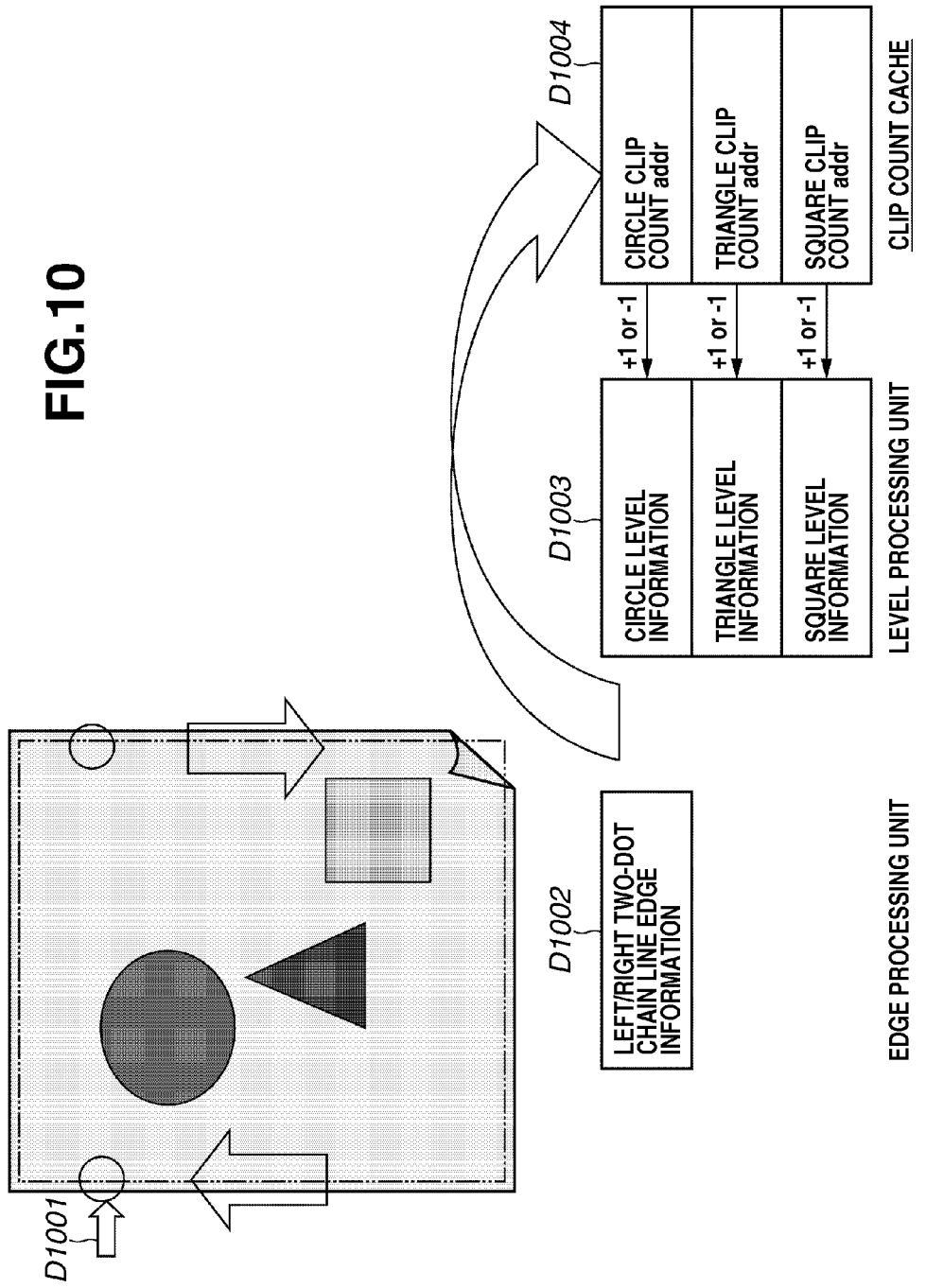
FIG. 10 illustrates processing of the second and subsequent lines after the line in which a page clip appeared according to an exemplary embodiment.

The print data including the pages illustrated in FIGS. 8 to 10 are print data in which a plurality of objects having different levels are defined. Therefore, such print data cannot be subjected to processing in which this plurality of objects is treated as a single object.

Modification

Figure 11:
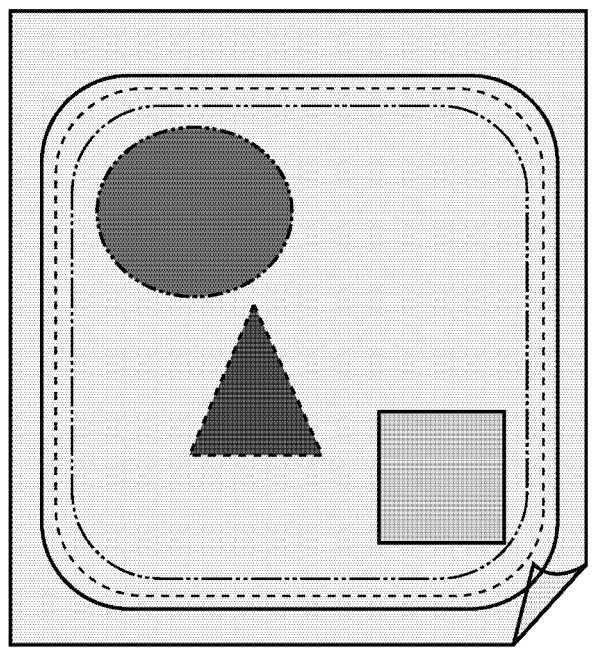
FIG. 11 illustrates a group clip according to an exemplary embodiment.

A page clip edge will now be described using FIG. 11. Object-centric rendering may also be performed by grouping a predetermined plurality of rendering objects into a single group. As illustrated in FIG. 11, three objects, a circular object, a triangular object, and a square object, are treated as a single group. In such a case, when a clip is not set for the respective objects, a group clip that includes these objects as a default value is set. In FIG. 11, although the three group clip edges appear to be drawn slightly offset from each other, these group edge are actually on the same locus.

In this case, similar to the page clip, by keeping a pointer to a single group clip edge and the clip counter for each object, the other group clip edges can be deleted. More specifically, when a clip was not set for an object, the present exemplary embodiment can still be applied even if a clip was not set for the page as a default value.

Page clip edge processing will now be described based on FIGS. 12A to 12D.

Figure 12A:
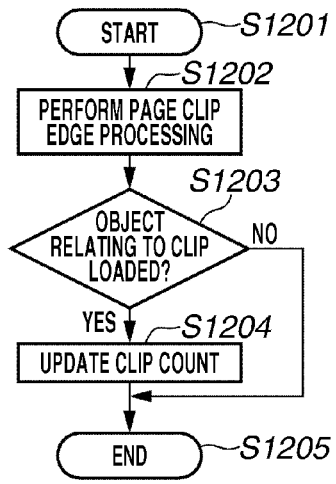
FIGS. 12A, 12B, 12C, and 12D are flowcharts illustrating page and group clip processing according to an exemplary embodiment.

FIG. 12A illustrates the updating of the clip count of an object relating to a clip. In step S1201, the processing starts. In step S1202, the processing described using FIG. 6 is performed. In step S1203, the data rendering unit 403 determines whether an object relating to the clip is already loaded. If it is determined that an object is already loaded (YES in step S1203), the clip count is updated as per normal, and the processing is finished in step S1205. However, if it is determined that an object is not already loaded (NO in step S1203), since this is not a rendering target, the clip count is not updated, and the processing is finished in step S1205. More specifically, the processing illustrated in FIG. 6 is not performed until an object corresponding to the loaded page clip edge is loaded into the memory. Consequently, the speed of the rendering processing in the rendering apparatus can be increased.

Figure 12B:
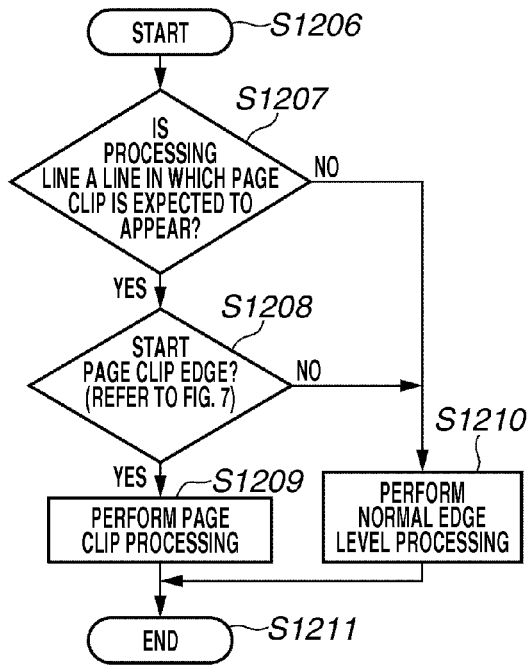

FIG. 12B illustrates the processing performed when the line in which a page clip appears is known. In step S1206, the processing starts. In step S1207, the data rendering unit 403 determines whether the line currently being processed is a line in which a page clip is expected to appear. If it is determined that a page clip is expected to appear in this line (YES in step S1207), in step S1208, the data rendering unit 403 determines whether this is the page clip start of FIG. 7. If it is determined that this is the page clip start of FIG. 7 (YES in step S1208), in step S1209, the target edge is processed as a page clip. If it is determined that a page clip is not expected to appear (NO in step S1207) or that this is not the page clip start (NO in step S1208), the processing proceeds to step S1210. In step S1210, the target edge is processed as a normal level.

Figure 12C:
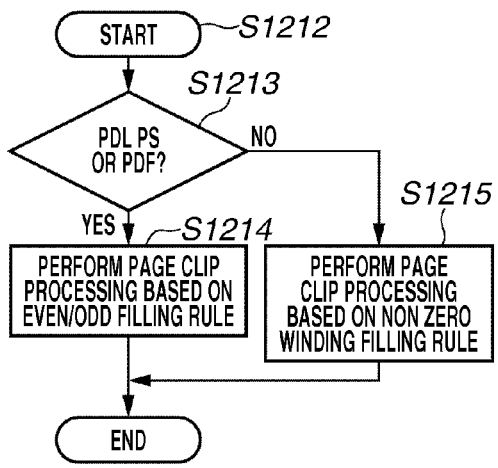

FIG. 12C illustrates processing performed based on the type of PDL to be processed. In step S1212, the processing starts. In step S1213, the data rendering unit 403 determines the type of PDL to be processed. If the PDL is PS or PDF (YES in step S1213), in step S1214, the data rendering unit 403 performs page clip processing based on an even/odd filling rule, and the processing proceeds to step S1216. If the PDL is some other PDL (NO in step S1213), the data rendering unit 403 performs page clip processing based on a non zero winding rule, and the processing proceeds to step S1216.

Figure 12D:
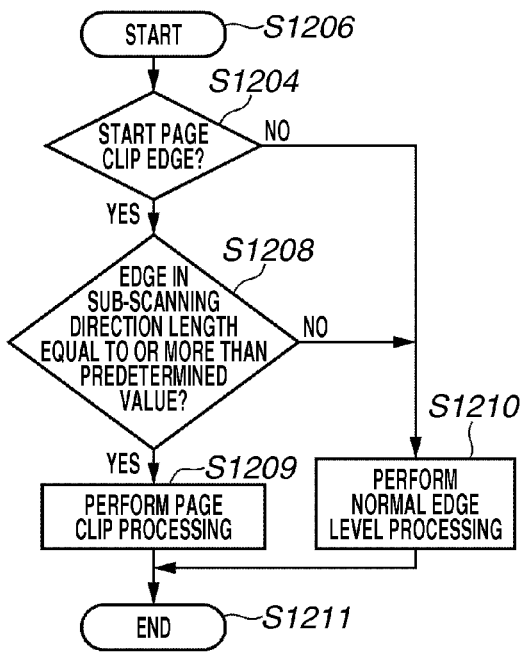

FIG. 12D illustrates processing for determining whether to perform group clip processing based on the length of an edge in group clip processing. In step S1217, the processing starts. In step S1218, the data rendering unit 403 determines whether the read edge is a group clip. If it is determined that the read edge is a group clip (YES in step S1218), in step S1219, the data rendering unit 403 determines whether the length of that edge in a sub-scanning direction is equal to or more than a predetermined value. If it is determined that the length of the edge is equal to or more than a predetermined value (YES in step S1219), in step S1220, the read edge is processed as a group clip edge, and the processing proceeds to step S1222. If it is determined that the read edge is not a group clip (NO in step S1218), or that the length of the edge is not equal to or more than a predetermined value (NO in step S1219), the processing proceeds to step S1221. In step S1221, the edge is processed as a normal clip, and the processing proceeds to step S1222.

As another exemplary embodiment, the present invention may be applied in a system configured from a plurality of devices. Further, the present invention may also be applied in an apparatus configured from a single device. Examples thereof include a scanner, a printer, a PC, a copying machine, a MFP, and a facsimile apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-094081 filed Apr. 15, 2010, which is hereby incorporated by reference herein in its entirety.

What is claimed is:

1. An apparatus configured to:
set a clip for a first object and a clip for a second object for a page in which both objects are defined;
perform edge processing for an edge scan line on edge information about a first page clip edge corresponding to the first object clip, edge information about a second page clip edge corresponding to the second object clip, edge information about an edge of the first object and an edge of the second object;
set, for the edge scan line, a first clip count corresponding to the first page clip edge and a clip second count corresponding to the second page clip edge to valid by reading edge information about the first page clip edge and the second page clip edge; and
render the first object after the first clip count is set to valid, and render the second object after the second clip count is set to valid, the apparatus comprising:
in a case of performing rendering based on print data in which a plurality of objects for which a clip is not set are defined, and rendering an object on a predetermined scan line, which is a scan line subsequent to the edge scan line,
an update unit configured to read edge information about a predetermined page clip edge on the predetermined scan line, and set a predetermined clip count corresponding to the predetermined page clip edge to valid, and set a different clip count corresponding to a different page clip edge to valid; and
a rendering unit configured to render an object corresponding to both page clip edges after the predetermined clip count and the different clip count are set to valid,
when the predetermined scan line is a first scan line, and the rendering apparatus is configured to render an object on a second scan line, which is a scan line one before the first scan line, the apparatus further comprising:
a storage unit configured to store edge information about the predetermined page clip edge and the different page clip edge; and
a delete unit configured to delete the edge information about the different page clip edge when the edge information about the page clip edges is edge information stored by a third scan line, which is a scan line one before the second scan line.

2. The apparatus according to claim 1, wherein
the update unit is configured to read edge information about the predetermined page clip edge, and
set the clip count corresponding to the predetermined page clip edge to valid and set the clip count corresponding to the different page clip edge to valid.

3. The apparatus according to claim 2, wherein
the rendering unit is configured to render an object corresponding to both page clip edges after the clip count corresponding to the predetermined page clip edge and the clip count corresponding to the different page clip edge are set to valid.

4. The apparatus according to claim 3 further comprising, when the rendering apparatus is configured to render an object on the third scan line:
a loading unit configured to load edge information about the predetermined page clip edge and the different page clip edge in a memory, wherein
the storage unit is configured to store the loaded edge information, and
the update unit is configured to read edge information about the predetermined page clip edge and the different page clip edge, set the clip counts corresponding to the predetermined page and the different page clip edges to valid, respectively.

5. The apparatus according to claim 4, wherein
the rendering unit is configured to render an object corresponding to both page clip edges after the clip counts corresponding to the predetermined and the different page clip edges are set to valid by the update unit.

6. The apparatus according to claim 4, wherein the update unit is configured to, in a scan line following after the first scan line, set the clip count corresponding to the different page clip edge to valid.

7. The apparatus according to claim 6, further comprising:
a first determination unit configured to determine whether an X coordinate of both a clip edge stored in the storage unit and a clip edge loaded by the loading unit are the same, determine whether a slant of both clip edges is the same, determine whether a length of both clip edges is the same, and determine whether a direction of both clip edges is the same.

8. The apparatus according to claim 7, wherein
a second determination unit configured to determine that both clip edges are page clip edges when the first determination unit determines that the X coordinate of both clip edges is the same, that the slant of both clip edges is the same, that the length of both clip edges is the same, and that the direction of both clip edges is the same.

9. A method comprising:
setting, a clip for a first object and a clip for a second object for a page in which both objects are defined;
performing edge processing an edge scan line on edge information about a first page clip edge corresponding to the first object clip, edge information about a second page clip edge corresponding to the second object clip, edge information about an edge of the first object, and edge information about an edge of the second object;

setting, for the edge scan line, a first clip count corresponding to the first page clip edge and a second clip count corresponding to the second page clip edge to valid by reading edge information about the first page clip edge and edge information about the second page clip edge; and rendering the first object after the first clip count set to valid, and rendering the second object after the second clip count is set to valid, wherein in a case of performing rendering based on print data in which a plurality of objects for which a clip is not set are defined, and rendering an object on a predetermined scan line, which is a scan line subsequent to the edge scan line, an update unit is configured to read edge information about a predetermined page clip edge on the predetermined scan line, and set a predetermined clip count corresponding to the predetermined page clip edge to valid, and set a different clip count corresponding to a different page clip edge to valid; and a rendering unit is configured to render an object corresponding to both page clip edges after the predetermined clip count and the different clip count are set to valid, when the predetermined scan line is a first scan line, the method further comprising:

rendering an object on a second scan line, which is a scan line one before the first scan line;

storing edge information about the predetermined page clip edge and the different page clip edge; and deleting the edge information about the different page clip edge when the edge information about the page clip edges is edge information stored by a third scan line, which is a scan line one before the second scan line.

10. The method according to claim 9, further comprising:
reading edge information about the predetermined page clip edge;

setting the clip count corresponding to the predetermined page clip edge to valid and setting the clip count corresponding to the different page clip edge to valid; and rendering an object corresponding to both page clip edges after the clip count corresponding to the predetermined page clip edge and the clip count corresponding to the different page clip edge are set to valid.

11. The method according to claim 10 further comprising, when rendering an object on the third scan line:
loading edge information about the predetermined page clip edge and the different page clip edge in a memory;
storing the loaded edge information;
reading edge information about the predetermined page clip edge and the different page clip edge; and
setting the clip counts corresponding to the predetermined page and the different page clip edges to valid, respectively.

12. The method according to claim 11, further comprising:
rendering an object corresponding to both page clip edges after the clip counts corresponding to the predetermined and the different page clip edges are set to valid by the update unit; and, in a scan line following after the first scan line,
setting the clip count corresponding to the different page clip edge to valid.

13. The method according to claim 12, further comprising:
determining whether an X coordinate of both a clip edge stored in the storage unit and a clip edge loaded by the loading unit are the same;
determining whether a slant of both clip edges is the same, determining whether a length of both clip edges is the same, and determining whether a direction of both clip edges is the same;
determining that both clip edges are page clip edges when the X coordinate of both clip edges is the same, the slant of both clip edges is the same, the length of both clip edges is the same, and that the direction of both clip edges is the same.

14. A non-transitory recording medium in which a program for executing the method according to claim 9 in a rendering apparatus is recorded.

15. The non-transitory recording medium according to claim 14, wherein the method, when the predetermined scan line is a first scan line, further comprises:
rendering an object on a second scan line, which is a scan line one before the first scan line;
storing edge information about the predetermined page clip edge and the different page clip edge; and
deleting the edge information about the different page clip edge when the edge information about the page clip edges is edge information stored by a third scan line, which is a scan line one before the second scan line.

16. The non-transitory recording medium according to claim 15, wherein the method further comprises:
reading edge information about the predetermined page clip edge;
setting the clip count corresponding to the predetermined page clip edge to valid and setting the clip count corresponding to the different page clip edge to valid; and
rendering an object corresponding to both page clip edges after the clip count corresponding to the predetermined page clip edge and the clip count corresponding to the different page clip edge are set to valid.

17. The non-transitory recording medium according to claim 16, wherein the method, when rendering an object on the third scan line, further comprises:
loading edge information about the predetermined page clip edge and the different page clip edge in a memory;
storing the loaded edge information;
reading edge information about the predetermined page clip edge and the different page clip edge; and
setting the clip counts corresponding to the predetermined page and the different page clip edges to valid, respectively.

18. The non-transitory recording medium according to claim 17, wherein the method further comprises:
rendering an object corresponding to both page clip edges after the clip counts corresponding to the predetermined and the different page clip edges are set to valid by the update unit; and, in a scan line following after the first scan line,
setting the clip count corresponding to the different page clip edge to valid.

* * * * *